United States Patent [19]

Yoshikawa et al.

[11] Patent Number: 5,681,611
[45] Date of Patent: Oct. 28, 1997

[54] LIGHT GUIDE AND METHOD FOR MAKING

[75] Inventors: Masato Yoshikawa; Minoru Ishiharada, both of Kodaira; Itsuo Tanuma, Sayama; Kazuo Naito, Kawasaki; Masato Sugimachi, Kodaira; Hideo Sugiyama, Higashimurayama, all of Japan

[73] Assignee: Bridgestone Corporation, Tokyo, Japan

[21] Appl. No.: 530,889

[22] Filed: Sep. 20, 1995

Related U.S. Application Data

[62] Division of Ser. No. 356,548, Dec. 15, 1994, Pat. No. 5,557,702.

[30] Foreign Application Priority Data

Dec. 15, 1993 [JP] Japan .................................. 5-343064
Dec. 15, 1993 [JP] Japan .................................. 5-343065

[51] Int. Cl.$^6$ ........................................................ B05D 5/06
[52] U.S. Cl. ........................ 427/163.2; 427/164; 427/230; 427/393.5; 427/335

[58] Field of Search ...................... 427/163.2, 535, 427/393.5, 230, 164

[56] References Cited

U.S. PATENT DOCUMENTS

| | | | |
|---|---|---|---|
| 3,816,160 | 6/1974 | Moore | 427/164 |
| 5,018,828 | 5/1991 | Ohdaira et al. | 385/145 |
| 5,153,288 | 10/1992 | Matsunaga et al. | 526/245 |
| 5,166,073 | 11/1992 | Lefkowitz et al. | 436/57 |
| 5,329,388 | 7/1994 | Yoshimiz | 359/42 |
| 5,382,448 | 1/1995 | Koike et al. | 427/163.2 |
| 5,420,959 | 5/1995 | Walker et al. | 385/145 |

*Primary Examiner*—Janyce Bell
*Attorney, Agent, or Firm*—Sughrue, Mion, Zinn, Macpeak & Seas

[57] ABSTRACT

A light guide includes a hollow tubular cladding of a fluorocarbon resin having a methacrylic or acrylic monomer graft polymerized inner surface. The cladding is integrally filled with a core of a methacrylic or acrylic resin which is polymerized to the graft polymerized surface.

5 Claims, 2 Drawing Sheets

LIGHT GUIDE AND METHOD FOR MAKING

This is a Divisional of application No. 08/356,548 filed Dec. 15, 1994 now U.S. Pat. No. 5,557,702.

BACKGROUND OF THE INVENTION

1. Field of the Invention

This invention relates to a light guide comprising a core of a methacrylic or acrylic resin and a cladding of a fluorocarbon resin firmly joined to the core. It also relates to a method for preparing the same.

2. Prior Art

Typical of currently available light guide tubes are tubes comprising a cladding in the form of a fluorocarbon resin tube which is filled with a liquid as a core. Since the core is liquid, the manufacture of these light guide tubes is complex. Such a light guide tube must be manufactured exactly to the necessary length because it cannot be cut to a desired length on use.

As to optical transmission media or cores, great attention is recently paid to plastic fibers because of ease of processing and low cost. The source material for forming plastic fibers which can serve as optical transmission media is mainly polymethyl methacrylate (PMMA). PMMA is well flexible as compared with quartz base glass fibers. More specifically, PMMA fibers having a diameter of less than about 1 mm are flexible. However, rods having a larger diameter have never been used as the light guide core.

We attempted to fill a cladding tube of a fluorocarbon resin with PMMA or a similar methacrylic or acrylic resin as the core. When a methacrylic or acrylic monomer was simply introduced into the fluoroplastic tube and polymerized in situ, the resulting methacrylic or acrylic resin was weakly joined to the fluoroplastic tube so that the light guide might not exert satisfactory optical transmission characteristics.

For improving the adhesion of a fluoroplastic member to another member, it is known in the prior art to treat the fluoroplastic member at its surface so as to be hydrophilic. Such conventional treatments on the member surface include mechanical roughening, chemical etching, metallic sodium treatment, and electric discharge treatment such as plasma and corona treatments. Among others, the plasma surface treatment is interesting as surface treatment on fluoroplastic members because it is clean and has a greater degree of freedom of surface modification. However, we found that simple plasma treatment of fluoroplastic members did not fully improve adhesion because fluorocarbon resins and methacrylic or acrylic resins were considerably different in surface energy. When a fluorocarbon resin layer was laid on a methacrylic or acrylic resin layer, delamination readily took place even on blunt bending. There is a need for a light guide tube wherein a fluorocarbon resin is firmly joined to a methacrylic or acrylic resin.

SUMMARY OF THE INVENTION

Therefore, an object of the present invention is to provide a novel and improved light guide comprising a cladding of a fluorocarbon resin and a core of a methacrylic or acrylic resin wherein both the components are firmly joined to each other. Another object is to provide a method for preparing the light guide.

We have found that when a fluorocarbon resin tube having a methacrylic or acrylic monomer graft polymerized surface at an inner surface thereof is used as the cladding and a methacrylic or acrylic monomer is fed into the tube and polymerized in situ to form a methacrylic or acrylic resin which serves as the core, there is obtained a light guide in which the core is firmly joined to the cladding and which has excellent optical transmission characteristics.

In general, a fluorocarbon resin and a methacrylic or acrylic resin poorly join to each other because Of substantial difference in surface energy therebetween. A light guide comprising a fluorocarbon resin cladding and a methacrylic or acrylic resin core readily undergoes delamination between the cladding and the core when it is bent a little. Studying the adhesion between a methacrylic or acrylic resin core and a fluorocarbon resin cladding, we have found that when a methacrylic or acrylic monomer is graft polymerized to the inner surface of a fluorocarbon resin tube and a methacrylic or acrylic monomer is polymerized on the graft polymerized surface, the methacrylic or acrylic monomer is polymerized not only with each other, but also with the graft polymer, resulting in a light guide in which the methacrylic or acrylic resin is firmly joined to the fluorocarbon resin tube.

More particularly, by treating the inner surface of a hollow tubular cladding of a fluorocarbon resin with a plasma in an inert gas atmosphere, feeding a graft-polymerizable methacrylic or acrylic monomer to the plasma-treated surface and effecting graft polymerization, thereby forming a graft polymer on the plasma-treated surface, and feeding a methacrylic or acrylic monomer onto the graft polymer and effecting polymerization, there is formed a core of a methacrylic or acrylic resin on the graft polymer. That is, there is obtained a light guide in which the methacrylic or acrylic resin core is closely and firmly joined to the fluorocarbon resin cladding.

By plasma treating a fluorocarbon resin surface in an inert gas atmosphere, especially helium gas, the fluorocarbon resin surface is rendered hydrophilic, that is, modified to be suitable for adhesion. Especially, plasma treatment with helium gas creates radicals at the fluorocarbon resin surface, with which a methacrylic or acrylic monomer can graft polymerize at a higher rate. In general, a polymerization inhibitor such as quinones is added to the methacrylic or acrylic monomer from the standpoints of storage stability and safety during preparation. If more than 20 ppm of a polymerization inhibitor is contained in the methacrylic or acrylic monomer, no graft polymerization takes place. With the content of polymerization inhibitor limited to 20 ppm or less, if a large amount of oxygen is dissolved in the monomer, no graft polymerization takes place even on the plasma treated surface. The content of dissolved oxygen in the monomer must be limited to 25 mg/liter or less at 20° C. before graft reaction can proceed. Then a graft polymerized surface is formed on the fluorocarbon resin member. When a methacrylic or acrylic monomer is further fed and polymerized on the graft polymerized surface, polymerization reaction can occur between the methacrylic or acrylic monomer and the grafted surface, resulting in a light guide comprising an acrylic resin core enclosed in a fluorocarbon resin cladding wherein the methacrylic or acrylic resin is closely and firmly joined to the fluorocarbon resin.

Investigating copolymers of various methacrylic or acrylic monomers for use as the solid core, we have found that an acrylic resin obtained by copolymerizing methacrylic acid or n-butyl methacrylate with another methacrylic or acrylic monomer remains flexible and light transmissive when shaped into a rod and is thus suitable as the core material.

Accordingly, the present invention provides a light guide comprising a hollow tubular cladding of a fluorocarbon resin having a methacrylic or acrylic monomer graft polymerized thereto at an inner surface thereof, and a core of a methacrylic or acrylic resin polymerized to the graft polymerized surface and integrally filled in the cladding.

According to the method of the present invention, a light guide is prepared by treating the inner surface of a hollow tubular cladding of a fluorocarbon resin with a plasma in an inert gas atmosphere; feeding to the plasma-treated surface a graft-polymerizable methacrylic or acrylic monomer containing up to 20 ppm of a polymerization inhibitor and up to 25 mg/liter of dissolved oxygen at 20° C., and effecting graft polymerization, thereby forming a graft polymer on the plasma-treated surface; and feeding a methacrylic or acrylic monomer onto the graft polymer and effecting polymerization, thereby forming a core of a methacrylic or acrylic resin on the graft polymer.

BRIEF DESCRIPTION OF THE DRAWINGS

The above and other objects, features and advantages of the present invention will be more fully understood by reading the following description taken in conjunction with the accompanying drawings.

DETAILED DESCRIPTION OF THE INVENTION

Figure 1:
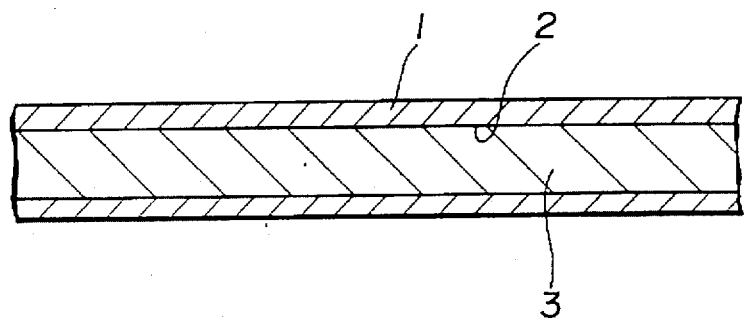
FIG. 1 is a fragmental schematic cross section of a light guide according to one embodiment of the invention.

Referring to FIG. 1, there is illustrated one exemplary light guide according to the invention. The light guide includes a hollow tubular cladding 1 of a fluorocarbon resin having a methacrylic or acrylic monomer graft polymerized thereto at an inner surface 2 thereof. The cladding 1 is integrally filled with a core 3 of a methacrylic or acrylic resin which is polymerized to the graft polymerized surface 2.

The fluorocarbon resin of which the cladding 1 is made includes polytetrafluoroethylene, perfluoroalkyl fluorocarbon resin, tetrafluorinated ethylene-hexafluorinated propylene copolymers, ethylene-tetrafluorinated ethylene copolymers, polychlorotrifluoro-ethylene, polyvinylidene fluoride, and polyvinyl fluoride resin.

A hollow tube is made from such a fluorocarbon resin and a methacrylic or acrylic monomer is graft polymerized to the inner surface of the tube. The hollow fluorocarbon resin tube having a methacrylic or acrylic monomer graft polymerized to the inner surface is the cladding 1.

Prior to forming the graft polymerized surface, the inner surface of the fluorocarbon resin tube is pretreated, typically by plasma treatment. The plasma treatment is preferably carried out in an inert gas atmosphere, for example, helium gas. Plasma treatment in a helium gas atmosphere is especially effective for accelerating the rate of subsequent graft polymerization. No particular limit is imposed on the technique and conditions of plasma treatment. Any of well-known plasma treatment techniques may be used. Preferably plasma treatment is carried out in a helium gas atmosphere by a low-pressure plasma technique under conditions: a vacuum of 0.01 to 10 Torr, a power of 10 to 500 W and a time of 1 second to 30 minutes because active radicals are created at the tube inner surface.

Figure 2:
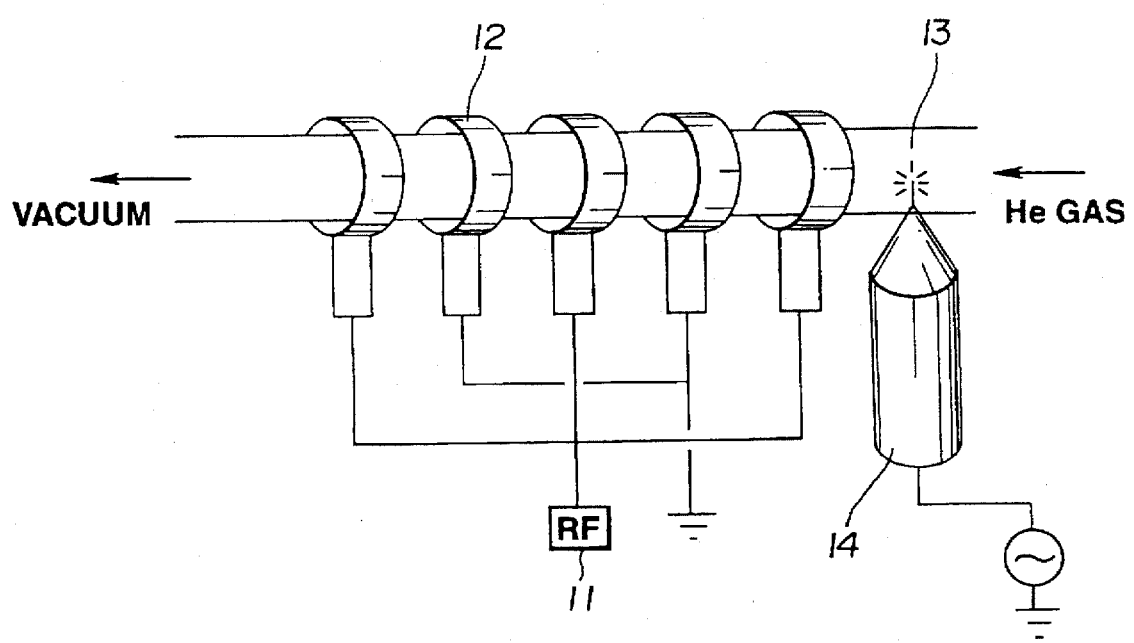
FIG. 2 schematically illustrates an exemplary apparatus for effecting plasma treatment on a fluorocarbon resin tube.

An apparatus as shown in FIG. 2 may be used for plasma treatment. The fluorocarbon resin tube for use as the cladding of a light guide generally has an inner diameter of at least 3 mm. For slender tubes having an inner diameter of less than 10 mm, however, it is difficult to induce an electric discharge inside the tube by a conventional technique. A fluorocarbon resin tube 13 is extended through a series of annular electrodes 12 electrically connected alternately to an RF power supply 11 and the ground. A tesla coil 14 is disposed upstream of the electrodes with respect to a flow of helium gas through the tube 13. The RF power supply 11 applies high frequency electricity to the electrodes 12 to generate a plasma within the tube 13. At this point, the tesla coil 14 triggers the electrodes 12 to ensure a stable electric discharge. Preferred conditions include an input power of about 50 W and a time of about 1 minute although the power and treating time depends on the tube moving speed.

Next, a graft polymerizable methacrylic or acrylic monomer is fed inside the plasma treated fluorocarbon resin tube where the monomer is graft polymerized to form a graft polymer. Non-limiting examples of the graft polymerizable methacrylic or acrylic monomer include acrylic acid and derivatives thereof such as methyl acrylate, ethyl acrylate, butyl acrylate, isobutyl acrylate, t-butyl acrylate, 2-ethylhexyl acrylate, lauryl acrylate, alkyl acrylates, tridecyl acrylate, stearyl acrylate, cyclohexyl acrylate, propyl acrylate, benzyl acrylate, isopropyl acrylate, sec-butyl acrylate, 2-hydroxyethyl acrylate, 2-hydroxypropyl acrylate, dimethylaminoethyl acrylate, diethylaminoethyl acrylate, glycidyl acrylate, tetrahydrofurfuryl acrylate, allyl acrylate, ethylene glycol diacrylate, triethylene glycol diacrylate, tetraethylene glycol diacrylate, 1,3-butylene glycol diacrylate, trimethylolpropane triacrylate, 2-ethoxyethyl acrylate, ethoxyethoxyethyl acrylate, 2-methoxyethyl acrylate, phenoxyethyl acrylate, phenoxypolyethylene glycol acrylate, and dimethylaminoethyl acrylate methyl chloride salt; and methacrylic acid and derivatives thereof such as methacrylate, ethyl methacrylate, butyl methacrylate, isobutyl methacrylate, t-butyl methacrylate, 2-ethylhexyl methacrylate, lauryl methacrylate, alkyl methacrylates, tridecyl methacrylate, stearyl methacrylate, cyclohexyl methacrylate, propyl methacrylate, benzyl methacrylate, isopropyl methacrylate, sec-butyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, allyl methacrylate, ethylene glycol dimethacrylate, triethylene glycol dimethacrylate, tetraethylene glycol dimethacrylate, 1,3-butylene glycol dimethacrylate, trimethylol propane trimethacrylate, 2-ethoxyethyl methacrylate, ethoxyethoxyethyl methacrylate, 2-ethoxyethyl methacrylate, phenoxyethyl methacrylate, phenoxypolyethylene glycol methacrylate, and dimethylaminoethyl methacrylate methyl chloride salt. A mixture of such monomers is also useful.

The graft polymerizable methacrylic or acrylic monomer which is used herein should meet the requirements that the content of a polymerization inhibitor is 0 to 20 ppm and the content of dissolved oxygen is up to 25 mg/liter at 20° C., especially up to 10 mg/liter at 20° C. No graft polymerization takes place if the content of a polymerization inhibitor exceeds 20 ppm or the content of dissolved oxygen exceeds 25 mg/liter at 20° C. Dissolved oxygen may be removed from the methacrylic or acrylic monomer, for example, by repeating the steps of freezing the monomer with liquid nitrogen, evacuating by means of a vacuum pump, and thawing. Alternatively, dissolved oxygen is removed by bubbling an inert gas such as nitrogen, argon and helium into the monomer.

Graft polymerization of the methacrylic or acrylic monomer is generally carried out using a polymerization initiator such as azobisisobutyronitrile (AIBN) and benzoyl peroxide (BPO), preferably in an amount of 0.01 to 1% by weight of the (total) weight of the monomer(s). Preferably graft polymerization is carried out in vacuum at a temperature of 40° to 100° C. for about 1 minute to 10 hours.

The cladding is integrally filled with the core material in the form of a methacrylic or acrylic resin. From the standpoints of flexibility and transparency, the preferred core materials are copolymers of methyl methacrylate (MMA) or n-butyl methacrylate (nBMA) with other methacrylic or acrylic monomers and methacrylic or acrylic homopolymers having a glass transition temperature near or below room temperature. The other methacrylic or acrylic monomer which can be copolymerized with MMA or nBMA include 2-methoxyethyl acrylate (2MTA), triethylene glycol acrylate (CBA), alkyl methacrylate (SLMA), and phenoxypolyethylene glycol acrylate (AMP-60 G). Preferably 100 parts by weight of MMA is blended with 70 to 100 parts by weight, more preferably 80 to 100 parts by weight of the other monomer. The blending ratio is not critical in the case of nBMA.

The core of methacrylic or acrylic resin is formed by charging the fluorocarbon resin tube having a methacrylic or acrylic monomer graft polymerized inner surface with the methacrylic or acrylic monomer whereupon the monomer is polymerized in situ. Simultaneously with polymerization of the methacrylic or acrylic monomer, the methacrylic or acrylic resin (or core) is bound to the fluorocarbon resin tube (or cladding). There is obtained a light guide in which the cladding and the core are firmly joined together.

For this polymerization, any of well-known polymerization techniques may be used. A polymerization initiator such as AIBN and BPO may be added in an amount as mentioned above. Preferably bulk polymerization is carried out in vacuum or an inert gas atmosphere at about 40° to 100° C. for about 1 minute to 10 hours.

EXAMPLE

Examples of the present invention are given below by way of illustration and not by way of limitation.

Examples 1–24 & Comparative Examples 1–3

Using a plasma treating apparatus as shown in FIG. 2, perfluoroethylene propylene copolymer (FEP) tubes having an outer diameter of 6 mm and an inner diameter of 5 mm were treated with a plasma in a helium gas atmosphere. Methyl methacrylate was then introduced into the tubes where it was graft polymerized. Graft polymerization was carried out in vacuum at a temperature of 60° C. for 3 hours.

Next, methacrylic or acrylic monomers were blended in a weight ratio as shown in Table 1. AIBN was added to the methacrylic or acrylic monomers in an amount of 0.5% by weight of the monomers and thoroughly dissolved therein. The monomeric solution was debubbled in a ultrasonic cleaning machine for 15 minutes and then introduced into the FEP tubes. With the tubes held in a water bath at 70° C., copolymerization was effected for 90 minutes. Where polymerization had not completed in 90 minutes, copolymerization was continued for a further 90 minutes. Light guide tubes were obtained in this way.

The light guide tubes were examined for bending delamination, adhesion and flexibility by the following methods.

Each light guide tube was cut to a test specimen of about 30 cm long. Using a cylindrical jig, the specimen was bent until a curvature radius of 50 mm was reached. For flexibility evaluation, those specimens which could be bent to the 50-mm curvature were rated good (O) and those specimens which could not be bent to the 50-mm curvature were rated rejected (X). For bending delamination evaluation, those specimens in which delamination occurred between the FEP tube and the core after bending were rated rejected (X) and those specimens in which no delamination occurred were rated good (O). The latter specimens free of delamination were further examined by cutting a longitudinal notch of 2 mm wide in the FEP tube and peeling off the tube. Adhesion was rated good (O) where cohesive failure occurred in the FEP tube or core.

The results are shown in Table 1.

TABLE 1

| | | Plasma treating time (min.) | Grafting monomer | Grafted or not | Core-forming monomers Type | Ratio | Bending delamination | Adhesion | Flexibility | Overall rating |
|---|---|---|---|---|---|---|---|---|---|---|
| Comparative Example | 1 | 0 | — | — | MMA/SLMA | 5:5 | X | X | O | X |
| | 2 | 0 | MMA | X | MMA/SLMA | 5:5 | X | X | O | X |
| Example | 1 | 1 | MMA | O | MMA/SLMA | 5:5 | O | O | O | O |
| | 2 | 1 | MMA | O | MMA/SLMA | 8:2 | O | O | O | O |
| | 3 | 1 | MMA | O | MMA/SLMA | 3:7 | O | O | O | O |
| | 4 | 1 | MMA | O | MMA/SLMA | 1:9 | O | O | O | O |
| | 5 | 1 | MMA | O | MMA/2MTA | 5:5 | O | O | O | O |
| | 6 | 1 | MMA | O | MMA/CBA | 5:5 | O | O | O | O |
| | 7 | 1 | MMA | O | MMA/AMP-60G | 5:5 | O | O | O | O |
| | 8 | 1 | MMA | O | nBMA | — | O | O | O | O |
| | 9 | 1 | MMA | O | SLMA | — | O | O | O | O |
| | 10 | 1 | MMA | O | 2MTA | — | O | O | O | O |
| | 11 | 1 | MMA | O | CBA | — | O | O | O | O |
| | 12 | 1 | MMA | O | AMP-60G | — | O | O | O | O |
| Comparative Example | 3 | 0 | 2MTA | X | MMA/SLMA | 5:5 | X | X | O | X |
| Example | 13 | 1 | 2MTA | O | MMA/SLMA | 5:5 | O | O | O | O |
| | 14 | 1 | 2MTA | O | MMA/SLMA | 8:2 | O | O | O | O |

TABLE 1-continued

| | Plasma treating time (min.) | Grafting monomer | Grafted or not | Core-forming monomers Type | Ratio | Bending delamination | Adhesion | Flexibility | Overall rating |
|---|---|---|---|---|---|---|---|---|---|
| 15 | 1 | 2MTA | O | MMA/SLMA | 3:7 | O | O | O | O |
| 16 | 1 | 2MTA | O | MMA/SLMA | 1:9 | O | O | O | O |
| 17 | 1 | 2MTA | O | MMA/2MTA | 5:5 | O | O | O | O |
| 18 | 1 | 2MTA | O | MMA/CBA | 5:5 | O | O | O | O |
| 19 | 1 | 2MTA | O | MMA/AMP-60 G | 5:5 | O | O | O | O |
| 20 | 1 | 2MTA | O | nBMA | — | O | O | O | O |
| 21 | 1 | 2MTA | O | SLMA | — | O | O | O | O |
| 22 | 1 | 2MTA | O | 2MTA | — | O | O | O | O |
| 23 | 1 | 2MTA | O | CBA | — | O | O | O | O |
| 24 | 1 | 2MTA | O | AMP-60G | — | O | O | O | O |

It is evident from Table 1 that in the sample which was not subject to graft treatment (Comparative Example 1) and the samples in which grafting did not take place (Comparative Examples 2 and 3), delamination occurred because the FEP tube and the core were not firmly joined. Those samples which had been graft treated withstood delamination upon bending because the methacrylic or acrylic resin core was firmly joined to the inner surface of the FEP tube. The procedure was repeated using copolymeric acrylic resins and homopolymers as the core material, obtaining fully flexible light guides having a core firmly joined to a cladding as shown in Table 1.

Reference Example

A perfluoroethylene propylene copolymer (FEP) sheet of 300 μm thick (manufactured by Daikin Industry K.K.) was plasma treated in a helium gas atmosphere at 0.5 Torr by RF (13.56 MHz) energization at 100 W. The plasma treating time is reported in Table 2. After the plasma treatment, the FEP sheet was placed in a glass container which was charged with the monomer shown in Table 2, refrigerated with liquid nitrogen for freezing the charge, and deaerated by means of a vacuum pump. The glass container was immersed in water at room temperature for thawing, fully shaken and then refrigerated again. This process was repeated 3 cycles. While shaking the glass container in a bath at a constant temperature shown in Table 2, graft polymerization was carried out in the container in vacuum for an appropriate time.

A graft polymerized surface was formed on the fluorocarbon resin sheet in this way. Each sample was examined for grafting by the following method.

The FEP sheet having a graft polymerized surface was taken out of the glass container and ultrasonic cleaned with methyl ethyl ketone (MEK) solution for removing MEK—soluble components. The sheet was dried in a vacuum dryer at 60° C. for more then one hour. Using a spectrometer FT-IR (VALOR-III manufactured by Nippon Bunko K.K.), the sheet was inspected by ATR method (ZnSe prism) whether or not a graft polymer was present on the surface. The sheet was rated good (O) when a graft polymer was present and rejected (X) when no graft polymer was observed.

Next, a methacrylic or acrylic monomer was polymerized to the graft polymerized surface for examining the joint formed between the surface and the methacrylic or acrylic resin.

Figure 3:
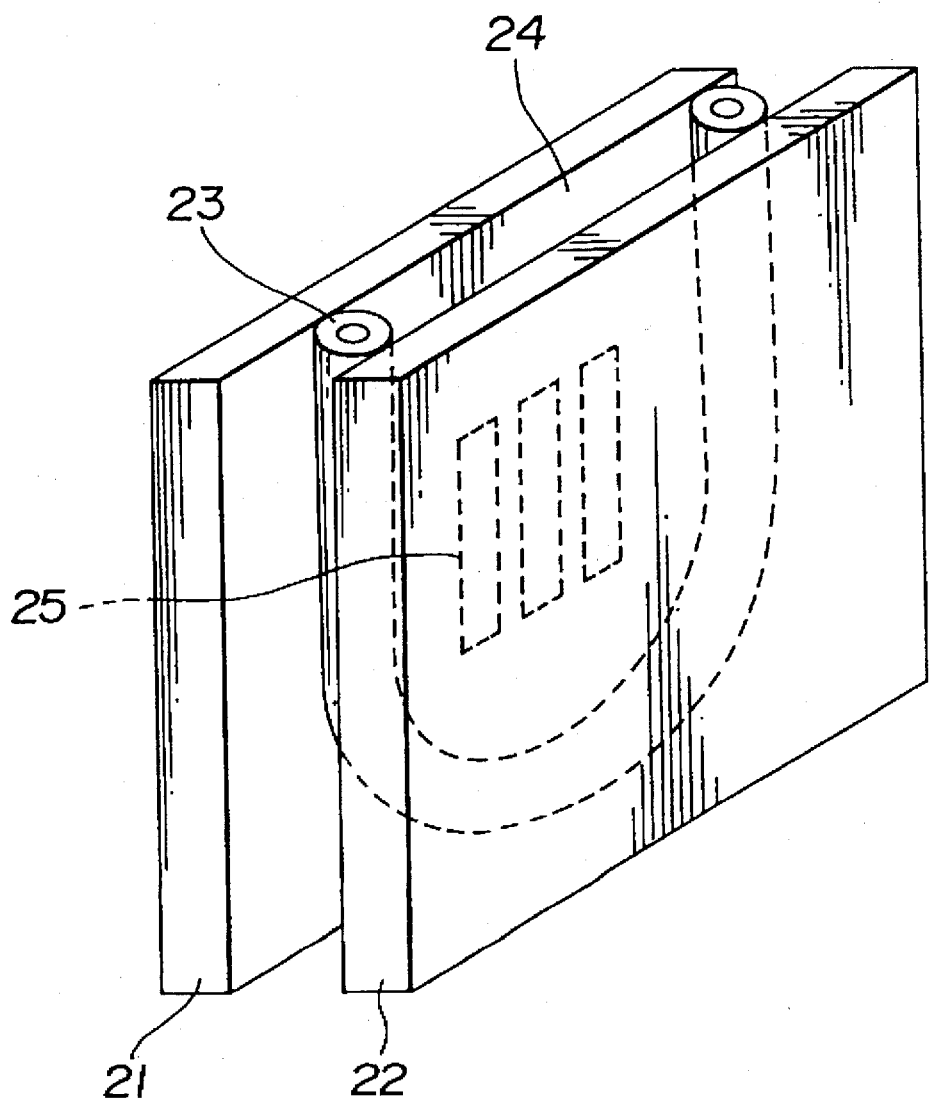
FIG. 3 is a perspective view of a test assembly.

A test assembly was set up as shown in FIG. 3. The assembly includes a pair of glass plates 21 and 22. A Teflon tube 23 bent in a U shape is sandwiched between the glass plates 21 and 22 and adhesively joined to the glass plates to define a space 24 therebetween. FEP sheets 25 having a graft polymerized surface were secured to one glass plate 21 within the space 24 using double side adhesive tape. The graft polymerized surface faced the space. An acrylic monomer (methyl methacrylate MMA) containing 0.5% by weight of a polymerization initiator (BPO) was poured into the space 24. With the assembly held in a bath at a constant temperature of 70° C., the acrylic monomer was polymerized to a thickness of 4 mm whereby the acrylic resin was joined to the FEP sheets. Using a tensile tester Autograph (manufactured by Shimaze Mfg. K.K.), each sample was tested by pulling at a rate of 50 mm/min. Adhesion was judged in terms of a rupture surface and bonding force. The samples were rated good (O) when adhesion was judged satisfactory and poor (X) when adhesion was judged poor. The results are shown in Tables 2 to 5.

The abbreviations in Tables have the following meaning.
MMA: methyl methacrylate
nBA: n-butyl acrylate
2EHA: 2-ethylhexyl acrylate
SLMA: alkyl methacrylate
nBMA: n-butyl methacrylate
2MTA: 2-methoxyethyl acrylate
CBA: ethoxyethoxyethyl acrylate
BzMA: benzyl methacrylate
CHMA: cyclohexyl methacrylate Table 2 shows the results of graft polymerization in terms of an amount of an inhibitor in the monomer. The inhibitor used was MEHQ. It is evident from Table 2 that graft polymerization takes place when the amount of inhibitor is less than 20 ppm. With respect to adhesion, it is evident that the acrylic polymer forms a firm joint to a grafted surface, but not to a non-grafted surface.

Table 3 shows the results of graft polymerization in terms of an amount of oxygen dissolved in the monomer. It is evident that graft polymerization takes place when the amount of dissolved oxygen is up to 25 mg/liter.

Table 4 shows the results of graft polymerization in terms of a plasma treating time. It is evident that no graft polymerization takes place on a non-grafted surface whereas graft polymerization takes place on a grafted surface, which eventually leads to a firm joint.

Table 5 shows the results of graft polymerization of various monomers or monomer mixtures in terms of an amount of inhibitor therein. It is evident that grafting reaction takes place in monomeric mixtures insofar as the amount of inhibitor is limited to less than 20 ppm and that a firm joint is formed to a grafted surface.

TABLE 2

Inhibitor amount and graft polymerization

| Run No. | | Plasma treating time | Monomer | Inhibitor Type | Amount (ppm) | Dissolved oxygen (mg/l) | Grafting temp. (°C.) | Grafting time (hr.) | Grafting | Adhesion |
|---|---|---|---|---|---|---|---|---|---|---|
| Example | 1 | 5 | MMA | MEHQ | 0 | 0.8 | 60 | 3 | ○ | ○ |
|  | 2 | 5 | 2MTA | MEHQ | 0 | 0.9 | 60 | 3 | ○ | ○ |
|  | 3 | 5 | MMA | MEHQ | 3 | 0.8 | 60 | 3 | ○ | ○ |
|  | 4 | 5 | nBA | MEHQ | 15 | 1.0 | 60 | 3 | ○ | ○ |
| Comparative | 5 | 5 | CHMA | MEHQ | 50 | 0.8 | 60 | 3 | X | X |
| Example | 6 | 5 | 2EHA | MEHQ | 100 | 1.0 | 60 | 3 | X | X |
|  | 7 | 5 | SLMA | MEHQ | 100 | 1.3 | 60 | 3 | X | X |
|  | 8 | 5 | 2MTA | MEHQ | 100 | 0.8 | 60 | 3 | X | X |
|  | 9 | 5 | CBA | MEHQ | 200 | 0.9 | 60 | 3 | X | X |
|  | 10 | 5 | BzMA | MEHQ | 200 | 0.9 | 60 | 3 | X | X |

TABLE 3

Dissolved oxygen and graft Polymerization

| Run No. | | Plasma treating time | Monomer | Inhibitor Type | Amount (ppm) | Dissolved oxygen (mg/l) | Grafting temp. (°C.) | Grafting time (hr.) | Grafting | Adhesion |
|---|---|---|---|---|---|---|---|---|---|---|
| Example | 11 | 5 | MMA | MEHQ | 3 | 0.8 | 60 | 3 | ○ | ○ |
|  | 12 | 5 | MMA | MEHQ | 3 | 1.3 | 60 | 3 | ○ | ○ |
|  | 13 | 5 | MMA | MEHQ | 3 | 5.2 | 60 | 3 | ○ | ○ |
| Comparative | 14 | 5 | MMA | MEHQ | 3 | 28.4 | 60 | 3 | X | X |
| Example | 15 | 5 | MMA | MEHQ | 3 | 116.1 | 60 | 3 | X | X |
| Example | 16 | 5 | 2MTA | MEHQ | 3 | 0.9 | 60 | 3 | ○ | ○ |
|  | 17 | 5 | 2MTA | MEHQ | 3 | 1.8 | 60 | 3 | ○ | ○ |
|  | 18 | 5 | 2MTA | MEHQ | 3 | 7.7 | 60 | 3 | ○ | ○ |
| Comparative | 19 | 5 | 2MTA | MEHQ | 3 | 25.8 | 60 | 3 | X | X |
| Example | 20 | 5 | 2MTA | MEHQ | 3 | 108.4 | 60 | 3 | X | X |

TABLE 4

Plasma treating time and graft polymerization

| Run No. | | Plasma treating time | Monomer | Inhibitor Type | Amount (ppm) | Dissolved oxygen (mg/l) | Grafting temp. (°C.) | Grafting time (hr.) | Grafting | Adhesion |
|---|---|---|---|---|---|---|---|---|---|---|
| Comparative Example | 21 | 0 | MMA | MEHQ | 3 | 0.8 | 60 | 3 | X | X |
| Example | 22 | 1 | MMA | MEHQ | 3 | 1.0 | 60 | 3 | ○ | ○ |
|  | 23 | 5 | MMA | MEHQ | 3 | 0.8 | 60 | 3 | ○ | ○ |

TABLE 5

Inhibitor amount and graft polymerization

| Run No. | | Plasma treating time | Monomer | Inhibitor Type | Amount (ppm) | Dissolved oxygen (mg/l) | Grafting temp. (°C.) | Grafting time (hr.) | Grafting | Adhesion |
|---|---|---|---|---|---|---|---|---|---|---|
| Example | 24 | 5 | MMA | MEHQ | 0 | 0.8 | 60 | 3 | ○ | ○ |
|  | 25 | 5 | MMA | MEHQ | 3 | 0.8 | 60 | 3 | ○ | ○ |
| Comparative Example | 26 | — | nBMA | MEHQ | 25 | 1.0 | 60 | 3 | X | X |
| Example | 27 | 5 | nBA | MEHQ | 15 | 1.0 | 60 | 3 | ○ | ○ |
|  | 28 | 5 | 2MTA | MEHQ | 0 | 0.9 | 60 | 3 | ○ | ○ |
| Comparative Example | 29 | 5 | 2MTA | MEHQ | 100 | 0.8 | 60 | 3 | X | X |
| Example | 30 | 5 | MMA nBMA = 1:1 | MEHQ | 14 | 0.8 | 60 | 3 | ○ | ○ |

TABLE 5-continued

Inhibitor amount and graft polymerization

| Run No. | | Plasma treating time | Monomer | Inhibitor | | Dissolved oxygen (mg/l) | Grafting temp. (°C.) | Grafting time (hr.) | Grafting | Adhesion |
| --- | --- | --- | --- | --- | --- | --- | --- | --- | --- | --- |
| | | | | Type | Amount (ppm) | | | | | |
| Comparative Example | 31 | 5 | MMA/nBMA = 1:9 | MEHQ | 23 | 1.0 | 60 | 3 | X | X |
| | 32 | 5 | MMA/nBMA = 1:19 | MEHQ | 24 | 0.9 | 60 | 3 | X | X |
| Example | 33 | 5 | MMA/nBMA = 1:1 | MEHQ | 9 | 0.8 | 60 | 3 | O | O |
| | 34 | 5 | MMA/nBMA = 1:9 | MEHQ | 14 | 0.8 | 60 | 3 | O | O |
| | 35 | 5 | MMA/nBA = 1:19 | MEHQ | 14 | 1.0 | 60 | 3 | O | O |
| | 36 | 5 | MMA/2MTA = 1:1 | MEHQ | 0 | 0.8 | 60 | 3 | O | O |
| Comparative Example | 37 | 5 | MMA/2MTA = 1:1 | MEHQ | 52 | 0.8 | 60 | 3 | X | X |

There has been described a light guide comprising a cladding of a fluorocarbon resin and a core of a methacrylic or acrylic resin wherein the cladding is firmly joined to the core. Since the core is solid, the light guide can be cut to any desired length on use. A firm joint between the cladding and the core prevents delamination even when the light guide is bent.

Japanese Patent Application Nos. 5-343064 and 5-343065 are incorporated herein by reference.

Although some preferred embodiment have been described, many modifications and variations may be made thereto in the light of the above teachings. It is therefore to be understood that within the scope of the appended claims, the invention may be practiced otherwise than as specifically described.

We claim:

1. A method for preparing a light guide comprising the steps of:

treating the inner surface of a hollow tubular cladding of a fluorocarbon resin with a plasma in an inert gas atmosphere;

feeding to the plasma-treated surface a graft-polymerizable methacrylic or acrylic monomer containing up to 20 ppm of a polymerization inhibitor and up to 25 mg/liter of dissolved oxygen at 20° C., and effecting graft polymerization at a temperature of about 40° to 100° C. for about 1 minute to 10 hours, thereby forming a graft polymer on the plasma-treated surface; and feeding a methacrylic or acrylic monomer onto the graft polymer and effecting polymerization, at about 40° to 100° C. for about 1 minute to 10 hours, thereby forming a core of a methacrylic or acrylic resin on the graft polymer.

2. The method of claim 1, wherein said methacrylic or acrylic resin comprises a copolymer of methacrylic acid or n-butyl methacrylate and another methacrylic or acrylic monomer.

3. The method of claim 2, wherein said other methacrylic or acrylic monomer is a monomer selected from the group consisting of 2-methoxyethyl acrylate, triethylene glycol acrylate, alkyl methacrylate and phenoxypolyethylene glycol acrylate.

4. The method of claim 1, wherein said inert gas atmosphere comprises helium gas.

5. The method of claim 1, wherein the content of dissolved oxygen is between 0 mg/liter and 10 mg/liter at 20° C.

* * * * *